(No Model.)
J. L. NEWCOMER.
EGG BEATER.
No. 318,786. Patented May 26, 1885.
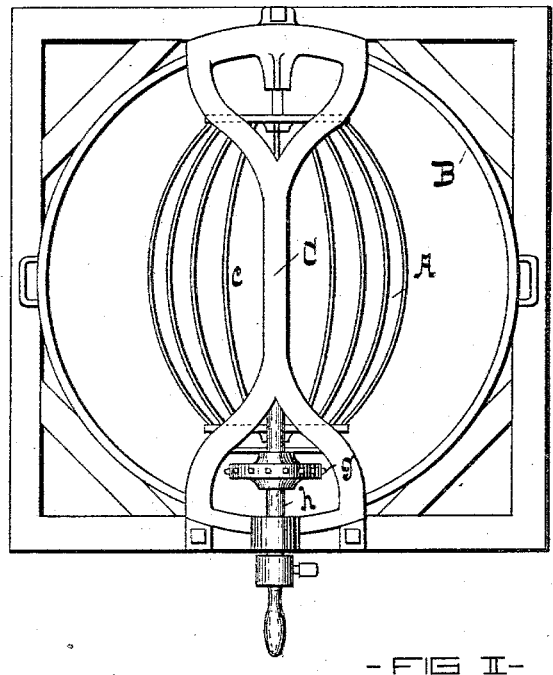
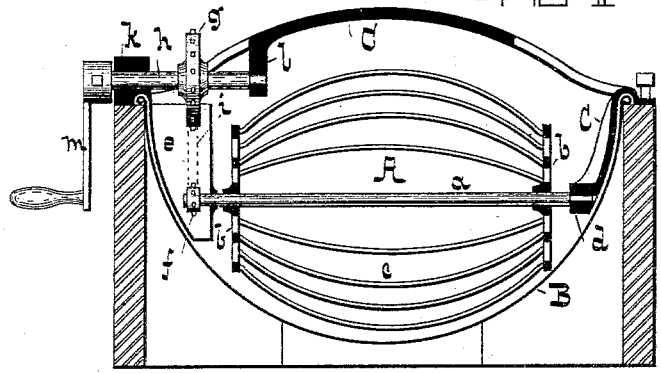
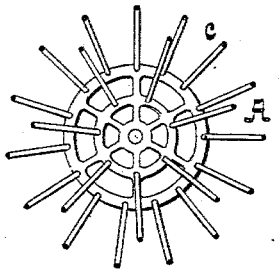
WITNESSES
Danl Fisher
E. Cruse
INVENTOR
Jacob L Newcomer
by Geo. W. S. Howard
Atty.

UNITED STATES PATENT OFFICE.

JACOB L. NEWCOMER, OF BALTIMORE, MARYLAND.

EGG-BEATER.

SPECIFICATION forming part of Letters Patent No. 318,786, dated May 26, 1885.

Application filed December 10, 1884. (No model.)

*To all whom it may concern:*

Be it known that I, JACOB L. NEWCOMER, of the city of Baltimore and State of Maryland, have invented certain Improvements in Egg-Beaters, of which the following is a specification.

The first part of this invention relates to the construction of the egg-beater proper, and, secondly, to the combination of the egg-beating device and a suitable pan to which it may be easily and readily attached when it is to be used, as will hereinafter fully appear.

In the drawings, Figure I is a top view of the invention. Fig. II is a sectional view of the egg-beater. Fig. III is a sectional view of a part of the invention, as hereinafter described.

A is a rotary egg-whip, which consists of a shaft, $a$, having the skeleton heads $b\ b$ and the wires $c$. The wires $c$ are curved, so as to make the exterior of the whip conform very nearly in shape to the hemispherical bottom of the pan B. By means of this correspondence in shape, the whip may be made to come very near to the surface of the pan B, in order that small quantities of eggs can be whipped.

The shaft $a$ at one end rests in a bearing, $d$, which is pendent from a frame, C, hereinafter described. It is situated considerably below the upper edge of the pan B, in order that a smaller whip may be used and have the same effect as a larger one. The other end of the shaft $a$ enters a box, $e$, which, like the bearing $d$ is pendent from the frame C. This box is open at the upper end only. The shaft $a$, within the box $e$, is provided with a small sprocket-wheel, $f$, which is in gear with a larger one, $g$, on an independent shaft, $h$, by means of an endless chain, $i$. This independent shaft $h$ has two bearings, $k$ and $l$, and is furnished with a crank, $m$, whereby the whip is operated through the medium of the mechanism described. The box $e$ prevents the contents of the pan B from coming in contact with the chain or sprocket wheels.

The frame C, which carries the whole of the moving mechanism, is secured to a wooden stand, D, in which the pan B is placed, by means of screws, as shown.

It will be seen that the pan B is not perforated for either shafts $a$ and $h$, consequently it may be used for other purposes when the egg-beating is concluded.

I claim as my invention—

In an egg-beater, the pan B, frame C, having the box $e$ and bearing $d$, rotary whip A, the shaft of which is situated below the upper edge of the said pan B, shaft $h$, situated over the upper edge of the pan, and means to communicate a rotary movement from the upper to the lower shaft, substantially as specified.

JACOB L. NEWCOMER.

Witnesses:
D. FISHER,
WM. T. HOWARD.